United States Patent
Yeung et al.

[11] Patent Number: 5,482,561
[45] Date of Patent: Jan. 9, 1996

[54] METHOD FOR REMOVING ORGANIC DEPOSITS FROM SAND PARTICLES WITH LASER BEAM

[75] Inventors: Flora Yeung, Agoura Hills, Calif.; Meryl R. Jackson, Carriere, Miss.

[73] Assignee: Hughes Aircraft Company, Los Angeles, Calif.

[21] Appl. No.: 296,265

[22] Filed: Aug. 25, 1994

Related U.S. Application Data

[63] Continuation of Ser. No. 74,650, Jun. 11, 1993, abandoned.

[51] Int. Cl.$^6$ .............................. B08B 6/00; B23K 26/00
[52] U.S. Cl. ..................... 134/1; 219/121.6; 219/121.66; 219/121.85
[58] Field of Search ........................... 134/1; 219/121.66, 219/121.85, 121.6

[56] References Cited

U.S. PATENT DOCUMENTS

| | | | |
|---|---|---|---|
| 4,756,765 | 7/1988 | Woodroffe | 134/1 |
| 5,024,968 | 6/1991 | Engelsberg | 437/173 |
| 5,151,134 | 9/1992 | Boquillon et al. | 134/1 |
| 5,151,135 | 9/1992 | Magee et al. | 134/1 |

*Primary Examiner*—Jan H. Silbaugh
*Assistant Examiner*—Saeed Chaudhry
*Attorney, Agent, or Firm*—M. E. Lachman; M. W. Sales; W. K. Denson-Low

[57] ABSTRACT

A method and system for removing organic deposits from the surface of sand particles. The organic deposits include molding compound and carbonaceous materials which are deposited on sand particles during their use in foundry operations. The organic deposits are exposed to a laser beam having a wavelength which is selectively absorbed by at least a portion of the organic deposits, while being essentially transmitted by the sand particles. The organic deposits are selectively heated by the laser beam resulting in vaporization and/or decomposition of the deposits without significant heating of the underlying sand particles.

4 Claims, 1 Drawing Sheet

METHOD FOR REMOVING ORGANIC DEPOSITS FROM SAND PARTICLES WITH LASER BEAM

This is a continuation of application Ser. No. 08/074,650 filed Jun. 11, 1993, now abandoned.

BACKGROUND OF THE INVENTION

1. Field of the Invention

The present invention relates generally to the removal of organic deposits from the surface of sand particles. More particularly, the present invention relates to foundry operations and methods for removing molding compounds, carbonaceous materials and other organic deposits from sand particles which are utilized in the foundry operations.

2. Description of Related Art

Sand is commonly used in foundry operations to form a wide variety of molds used in casting and fabricating metal parts. During the molding process, the sand particles are coated with molding compounds which are necessary in order to form adequate mold surfaces. Upon completion of the molding process, the mold is destroyed leaving a pile of sand particles which are contaminated with molding compound, carbonaceous material and other organic deposits resulting from the molding process. These organic deposits render the sand unsuitable for further use in the foundry operations. As a result, large amounts of contaminated sand must be stored at the foundry location or transported to another location for disposal.

Processes have been developed in many foundries for recycling the sand particles. Such recycling processes involve heating of the sand particles to high temperatures in order to combust any organic deposits which may be present on the sand particles. In general, the sand particles are heated to relatively high temperatures for relatively long periods of time to insure complete combustion of the organic deposits. The heating process necessarily requires that the entire sand particle be heated to high temperature. As a result, large amounts of fuel must be burned to achieve sufficient heating to completely remove organic contaminants from the sand particles. The requirement of heating the entire sand particle also results in increased heating times and prolonged cooling times. The high energy demand and relatively cumbersome heating process are problems which have made this type of recycling process less than satisfactory.

It would be desirable to provide a simple, quick and efficient technique for removing molding compound and other organic deposits from sand produced in foundry operations. The process should be amenable to treating the large amounts of sand produced in a typical commercial scale foundry operation in a simple and energy efficient manner.

SUMMARY OF THE INVENTION

In accordance with the present invention, a method and system are provided for removing organic deposits from the surface of sand particles produced in foundry operations. The invention is based upon the discovery that the organic deposits can be removed from sand particles by exposing the particles to a laser beam that has a wavelength which is absorbed only by the organic deposits while being transmitted by the sand particles. The selective absorption of the laser beam by the organic deposits results in localized heating and vaporization and/or decomposition of the organic deposits without heating the sand particles. The localized heating of the organic deposits by the laser beam reduces energy losses associated with prior methods wherein the entire sand particle was heated.

The present invention is based upon a method for removing organic deposits from the surface of sand particles wherein the organic deposits are exposed to a laser beam having a wavelength which is selectively absorbed by at least a portion of the organic deposits and which is essentially transmitted by the sand particles. In addition, the laser beam must be of a sufficient intensity and the organic deposits must be exposed to the laser beam for a sufficient time to vaporize and/or decompose at least a portion of the organic deposits. The method is especially well-suited for use in removing molding compound and other carbonaceous material present on sand particles used in the molding process of foundry operations.

As a feature of the present invention, a variety of organic deposits having different absorption properties may be simultaneously removed from sand particles by exposing the particles to additional laser beams having different wavelengths which correspond to absorption bands for the different organic deposits. In addition, the focus of the laser beam may be varied to provide a range of exposure areas for treating different amounts of sand surface area. Also contemplated within the present invention is the exposure of the contaminated sand to multiple laser beams having the same wavelength in order to increase the capacity of the sand cleaning method.

The above-discussed and many other features and attendant advantages of the present invention will become better understood by reference to the following description of the preferred embodiments when taken in conjunction with the accompanying drawings.

BRIEF DESCRIPTION OF THE DRAWING

The drawing is a schematic representation of a preferred exemplary system in accordance with the present invention for cleaning organic deposits from sand particles using a laser beam.

DESCRIPTION OF PREFERRED EMBODIMENTS

Figure 1:
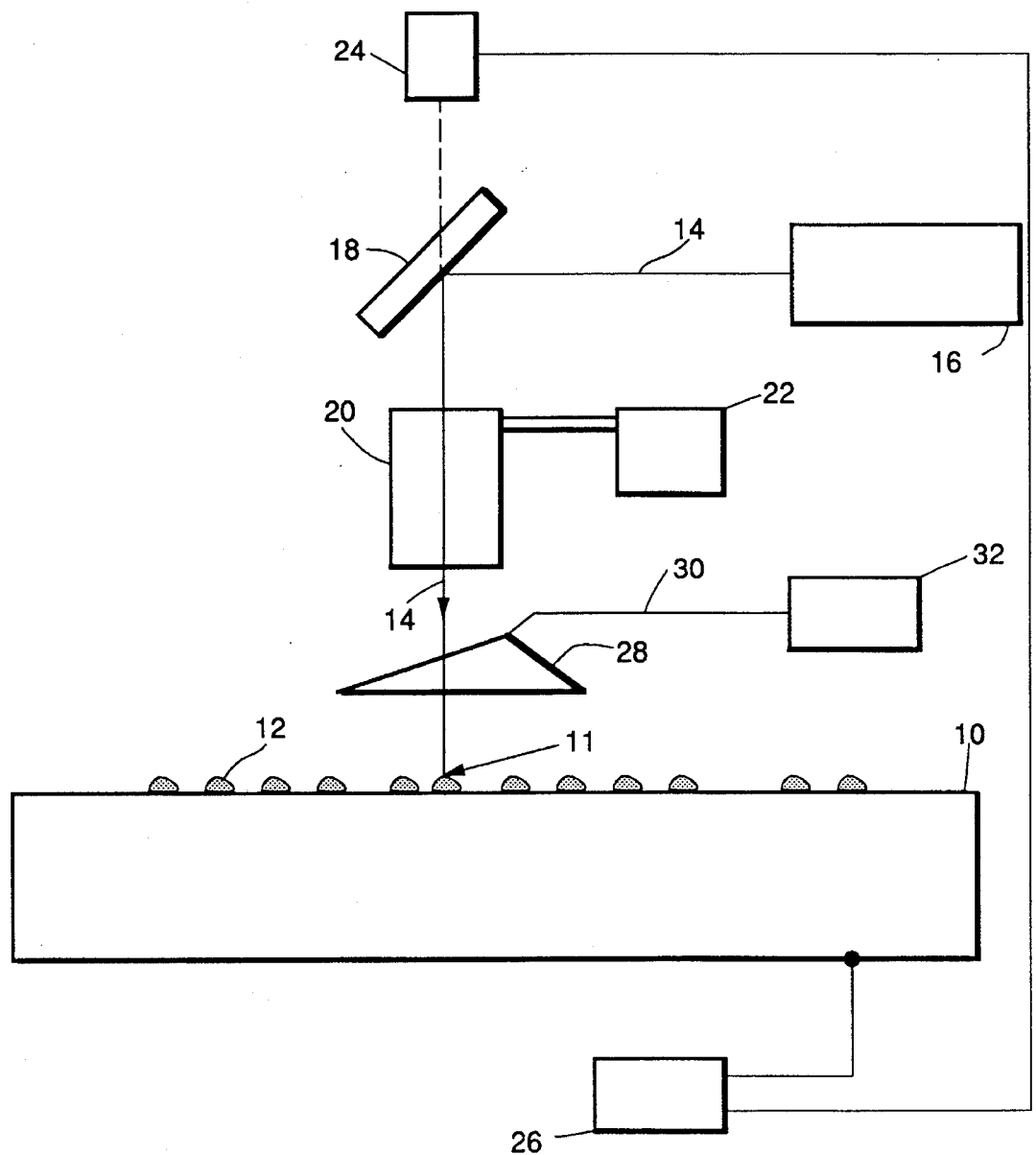

The present invention utilizes a laser beam to vaporize or decompose organic deposits present on sand particles. The present invention has wide application to the removal of organic deposits from sand particles and other ceramic materials, and is particularly well-suited for removing residual molding compound which is present on sand particles that have been used to form molds as part of a foundry operation. Such molding compounds include, for example, styrene and its polymeric compounds and phenolic compounds. In addition to removing residual molding compound present on spent foundry sand, the present invention may also be used to remove carbonaceous materials and any other organic deposit which absorbs electromagnetic radiation in the ultraviolet range (UV), visible range or near infrared range (IR). The term "carbonaceous materials" is used herein to mean any solid, liquid, or absorbed gaseous material containing carbon alone or in combination with other elements.

The present invention is applicable to removing any organic deposit which absorbs radiant energy in the UV-visible-IR range, and is particularly well-suited for removing those organic deposits which absorb electromagnetic radiation having wavelengths in the range of 300 nanometers to 10,600 nanometers. While the following description will be limited to the removal of molding compound residue from foundry sand, it will be understood by those skilled in the art that the present invention is useful in removing a wide variety of organic deposits from a wide variety of substrates.

A schematic representation of a preferred exemplary system to carry out the method of the present invention is shown in the drawing. A conveyor belt system shown schematically at 10 is used to transport sand into a laser exposure zone 11 where the sand 12 is exposed to a laser beam 14. The sand 12 can be in the form of discrete piles on the conveyor belt 10 or it may be evenly distributed over the conveyor belt surface.

In the preferred exemplary embodiment, a continuous wave neodymium-doped yttrium aluminum garnet (CW Nd:YAG) laser shown schematically at 16 is utilized to provide a laser beam 14 which has a wavelength of 1064 nanometers. The laser beam 14 from laser 16 is directed against a dichroic beam splitter 18 and passed through an objective lens assembly 20. The objective lens 20 provides the desired focusing of the beam onto sand particles 12 as they travel past the laser beam on conveyor system. A driving mechanism 22 is associated with the objective lens assembly 20 in order to provide for adjustment of the distance between the objective lens assembly 20 and the exposure zone 11. The driving mechanism 22 comprises a stepping motor (not shown) and a driving belt (not shown), and is operated under computer control. Using the driving mechanism 22, different laser spot size, and hence sand coverage area, can be selected to optimize the cleaning rate and efficiency. The production of a laser beam of a desired wavelength and the focusing and movement of a laser beam are known in the art and need not be discussed in detail herein.

Although a CW Nd:YAG laser is preferred due to the wide availability of such lasers, other lasers may be utilized provided that they are capable of producing laser electromagnetic radiation in the preferred range of 300 nanometers to about 10,600 nanometers. Other suitable lasers which may be used in carrying out the method of the present invention include krypton ion lasers, excimer lasers, and carbon dioxide lasers. The power range of the laser 16 will vary widely depending upon the amount of sand being treated. For cleaning of foundry sand on a small scale, lasers having a power range of up to 100 watts are suitable. However, when large amounts of foundry sand are to be cleaned, a laser having power levels on the order of 1,000 watts and even greater may be utilized. If desired, multiple lasers may be used to direct multiple beams of laser light onto the sand particles as they pass through the exposure zone 11 on the conveyor belt 10.

Both continuous wave (CW), and pulsed lasers can be used in the present process for sand cleaning. A CW laser with continuous output is more efficient when operating in conjunction with the conveying belt system. With pulsed lasers, the laser on/off time must be synchronized with the sand movement into and out of the laser spot area. Lasers with repetition rates of about 1 to 1,000 Hz are preferably used. In addition, the sand particles may be sequentially or simultaneously exposed to laser beams having different wavelengths. The sand particles may have a variety of different carbonaceous materials or organic deposits which have different peak absorption ranges. In such cases, the use of multiple laser beams having wavelengths which correspond to the various different absorption ranges for the organic deposits provides a simple and efficient means for simultaneously vaporizing and/or decomposing the various contaminants.

The objective lens assembly 20 is provided so that the laser beam may be focused or defocused as desired to decrease or increase the area covered by the laser beam. By defocusing the laser beam and increasing the laser power, larger areas of sand particles can be exposed to the laser beam at any one time to thereby increase the capacity of the system. Some carbonaceous deposits may be relatively difficult to vaporize and/or decompose. In these situations, it is desirable to narrowly focus the laser beam to provide high energy localized heating which is more effective than the defocused beam in vaporizing and/or decomposing the carbonaceous material.

A detector 24 is provided for determining when the organic deposits have been substantially removed from the sand particles. The detector 24 may be a camera which is attached to a television monitor to provide visual assessment. Optionally, the detector 24 may be a sensor which measures an increase or decrease in reflected radiation from the sand particles, which is correlated with the extent of cleaning of the sand particles.

The detector 24 is connected to a controller 26 which in turn is connected to the drive motor (not shown) for the conveyor belt 10. The controller 26 controls the speed at which sand particles are passed through the laser beam exposure zone 11 so that substantially all of the organic deposits, i.e. molding compound residues, are removed from the particles. The exposure time required for removing the organic deposits from the sand particles will vary widely depending upon the number of laser beams used, the power of the laser beams and the extent of defocusing of the beam(s).

Although a detector/controller system 24, 26 is preferred in order to provide an accurate indication of the extent of organic deposit removal, it is possible to visually inspect the sand particles after exposure to the laser beam to obtain a qualitative measurement of sand cleanliness. For example, the change in color of the sand particles from a dark color prior to laser beam exposure to a much lighter color after laser beam exposure provides a visual indication as to the degree of cleaning. Whether a sensor/controller assembly is used or the sand is visually inspected, the speed at which the sand particles travel through the laser exposure zone 11 is easily controlled to provide adequate exposure to remove substantially all of the organic deposits.

A vapor removal device 28 is provided for removing the vaporized and/or decomposed organic material. The volatile organic materials are removed through line 30 to a condensing system or scrubber 32. Any of the conventional condensing or scrubber systems may be used to separate out and recover the volatilized organic deposits. The vaporized deposits may also be combusted in an incinerator system if desired.

Sand particles typically used in molds for foundry operations have particle sizes on the order of about 0.5 to about 1.0 millimeter. The organic deposits present on the foundry sand particles principally include residues of molding compounds which remain after high temperature molding of metal castings. These organic deposits include polystyrene and carbonaceous materials. A variety of other organic deposits may also be present including styrene monomer, phenolic residue, and aldehydes.

In an exemplary system, foundry sand particles coated with polystyrene and carbonaceous materials were exposed to a 1.06 micron CW Nd:YAG:YAG laser at a variety of intensities and exposure times. At 0.1 second pulse duration, the shortest pulse producible by the CW Nd:YAG:YAG laser, individual sand particles were cleaned with laser power in the range of 0.5 watt (W) to 1.5 W. The laser beam spot diameter was less than or equal to the sand particle size. One pulse was all that was required to vaporize and/or decompose the polystyrene and carbonaceous materials which were coated on the foundry sand particles. The actual absorption/vaporization time which is necessary to remove the polystyrene and carbonaceous materials may be even shorter than the 0.1 second pulse duration used in this example. At such short exposure times, heating of the sand particle itself is kept to a minimum so that substantially all of the laser energy is devoted to heating and vaporizing the carbon deposits.

As is apparent from the above example, the use of a laser beam provides an especially quick technique for removing organic deposits from the surface of sand particles and other ceramic materials. Although the above example describes exposing individual sand particles to a highly focused laser beam, it will be apparent to those skilled in the art that multiple laser beams or expanded beam areas can be used to increase the cleaning rate and efficiency. For example, with reflecting optics, the laser exposure zone through which the sand is passed can be increased to allow for the exposure of relatively large amounts of sand in a continuous cleaning process.

The above description has been limited to a preferred exemplary system wherein a conveyor assembly is used to transport sand through a laser beam exposure area. As will be recognized by those skilled in the art, any other type of continuous or batch process which provides for relative motion between the contaminated sand particles and the laser beam can be used to carry out the method of the present invention. For example, the contaminated sand particles may remain stationary and the laser beam may be moved over the sand particles. The particular laser wavelength, laser power, laser focusing area and duration of exposure are all parameters which can be established quickly and easily for the particular organic deposits which are to be removed from sand particles.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the specific embodiments as illustrated herein, but is only limited by the following claims.

What is claimed is:

1. A method for removing organic deposits selected from the group consisting of polystyrene, styrene monomer, phenolic residue, aldehydes, and carbonaceous materials, from surfaces of sand particles consisting of the step of exposing said sand particles having said organic deposits to at least one continuous wave laser beam having a wavelength which is selectively absorbed by said organic deposits and which is essentially transmitted by said sand particles, said laser beam being of a sufficient intensity and said organic deposits being exposed to said laser beam for a sufficient time to vaporize or decompose said organic deposits to thereby remove said organic deposits from said surfaces without substantially heating said sand particles.

2. The method for removing organic deposits from surfaces of sand particles according to claim 1 wherein the wavelength of said laser beam is between about 300 nanometers and 10,600 nanometers.

3. The method for removing organic deposits from surfaces of sand particles according to claim 1 wherein said at least one continuous wave laser beam comprises a first laser beam having a first wavelength and a second laser beam having a second wavelength which is different from said first wavelength.

4. The method for removing organic deposits from surfaces of sand particles according to claim 3 wherein the wavelengths of the laser beams are between about 300 nanometers and 10,600 nanometers.

\* \* \* \* \*